United States Patent Office 3,784,495
Patented Jan. 8, 1974

3,784,495
ROOM TEMPERATURE SOLUBLE MELT-CONDENSED POLYAMIDE INTERPOLYMERS
Jerome William Sprauer, Wilmington, Del., assignor to E. I. du Pont de Nemours and Company, Wilmington, Del.
No Drawing. Filed Dec. 16, 1971, Ser. No. 208,930
The portion of the term of the patent subsequent to Jan. 25, 1989, has been disclaimed
Int. Cl. C08g 20/20
U.S. Cl. 260—18 N                                         6 Claims

ABSTRACT OF THE DISCLOSURE

Melt-condensed polyamide interpolymers consisting essentially of at least four different recurring polyamide repeat units in which (a) about 35 to 55 percent of the amide equivalents are polymethylene-ω-aminoacid repeat units of 6 to 20 carbon atoms, (b) about 10 to 30 percent of the amide equivalents are diamine diacid repeat units in which the diamine is polymethylene diamine of 6 to 20 carbon atoms and the diacid is polymethylene diacid of 6 to 20 carbon atoms, (c) about 10 to 30 percent of the amide equivalents are diamine diacid repeat units in which the diamine is polymethylene diamine of 6 to 20 carbon atoms and the diacid is polymethylene diacid of 6 to 20 carbon atoms different from the diacid of (b) above, and (d) about 10 to 30 percent of the amide equivalents are diamine diacid repeat units in which the diamine is polymethylene diamine of 6 to 20 carbon atoms and the diacid is polymethylene diacid of 6 to 20 carbon atoms different from the diacids of (b) and (c) above, or dimerized fatty acid of 16 to 48 carbon atoms, are soluble to the extent of at least about 20 percent in common solvents at room temperature.

BACKGROUND OF THE INVENTION

(1) Field of the invention

This invention relates to novel melt-condensed polyamide interpolymers which are soluble in common solvents at room temperature.

(2) Description of the prior art

Linear polyamides with a number-average molecular weight of at least 10,000, which are commonly called "nylons," are valued for a combination of properties including toughness, hardness, inertness, solvent resistance, abrasion resistance, and relatively high crystalline melting point.

The uses of nylons have been limited in some areas by their insolubility in common volatile industrial solvents. Certain nylon interpolymers have been described in U.S. Pat. No. 2,285,009, for example, which are soluble in hot alcohol, such as methanol, ethanol, etc. However, previously known nylons have been relatively insoluble in common industrial solvents at room temperature. Moreover, when concentrated solutions of previously known nylons are prepared by heating, they gel upon storage at room temperature. Hence previous solvent formulations of nylons have had to be applied hot or shortly following a heating step which effected solution. Therefore, it would be desirable to provide a nylon which is relatively soluble in common solvents at room temperature.

SUMMARY OF THE INVENTION

Melt-condensed polyamide interpolymers have now been discovered which are relatively soluble at room temperature in common volatile industrial solvents, while at the same time retaining valued nylon properties. These melt-condensed polyamide interpolymers consist essentially of at least four different recurring polyamide repeat units in which (a) about 35 to 55 percent of the amide equivalents are polymethylene-ω-aminoacid repeat units of 6 to 20 carbon atoms, (b) about 10 to 30 percent of the amide equivalents are diamine diacid repeat units in which the diamine is polymethylene diamine of 6 to 20 carbon atoms and the diacid is polymethylene diacid of 6 to 20 carbon atoms, (c) about 10 to 30 percent of the amide equivalents are diamine diacid repeat units in which the diamine is polymethylene diamine of 6 to 20 carbon atoms and the diacid is polymethylenediacid of 6 to 20 carbon atoms different from the diacid of (b) above, and (d) about 10 to 30 percent of the amide equivalents are diamine diacid repeat units in which the diamine is polymethylene diamine of 6 to 20 carbon atoms and the diacid is selected from the group consisting of (1) polymethylene diacids of 6 to 20 carbon atoms different from the diacids of (b) and (c) above, and (2) dimerized fatty acids of 16 to 48 carbon atoms. These polyamides are soluble to the extent of at least about 20 percent, based on the weight of solution, at 23° C. in a solvent mixture containing 2 parts by weight of methanol and 1 part by weight of toluene.

DETAILED DESCRIPTION OF THE INVENTION

The polyamide interpolymers of this invention consist essentially of at least four different recurring polyamide repeat units. By "polyamide repeat unit" is meant, for example, a polymer unit of the structure (I) 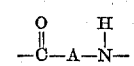

or (II) 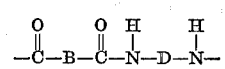

in which A, B and D are the same or different inert divalent linking radicals, for example hydrocarbylene groups which preferably are polymethylene groups.

The term "consisting essentially of," as used throughout the specification and claims, is intended to include unspecified polyamide repeat units which do not materially affect the basic and novel characteristics of the polyamide. That is, this erm excludes polyamides containing unspecified repeat units of the type and in amounts which prevent the improved solubility properties described herein from being realized. For example, a minor amount of diethylene triamine can be advantageously used in place of hexamethylene diamine to introduce a low concentration of imine-links in the polymer chain as shown in Example 3. Up to about 20 percent by weight of polyamide-forming monomer ingredients such as branched alkylene diamines, diacids, or aminoacids which are outside the scope of the specified monomers can be used for special purposes. One might also include minor amounts of terephthalic acid or p-aminocyclohexyl-bis-methane to raise slightly the glass transition temperature for some special reason. Acetic acid may also be used to control molecular weight.

The quantity of each required repeat unit in the polyamides of this invention is expressed in terms of the percentage of the total amide equivalents in the polymer. The number of amide equivalents in a given repeat unit is determined by the number of amide linkages represented by that repeat unit. The amide equivalent weight of a given repeat unit is determined by dividing the molecular weight of the repeat unit by the number of amide equivalents represented by that repeat unit. For example, the amide equivalent weight of an aminoacid repeat unit of structure (I) above is the molecular weight of the aminoacid repeat unit. The amide equivalent weight of a diamine diacid repeat unit of structure (II) above is one-half the molecular weight of the diamine diacid repeat unit.

In order for the polyamide interpolymers of this invention to contain at least four different repeat units, they must be derived from at least five different polyamide-forming monomers. One of the required polyamide-forming monomers is polymethylene-omega-aminoacid of 6 to 20 carbon atoms. Suitable aminoacids include 6-aminocaproic, 7-aminoheptanoic, 8-aminocaprylic, 9-aminononanoic, 10-aminodecanoic, 11-aminoundecanoic, 17-aminoheptadecanoic acid, and mixtures thereof, and the like.

A second required polyamide-forming monomer is polymethylene diamine of 6 to 20 carbon atoms. Suitable polymethylene diamines include hexamethylene, heptamethylene, octamethylene, nonamethylene, decamethylene, undecamethylene, dodecamethylene, tridecamethylene, octadecamethylene diamine, and mixtures thereof, and the like.

The third, fourth and fifth required polyamide-forming monomers are diacids. These diacids include at least two different polymethylene diacids of 6 to 20 carbon atoms. Suitable polymethylene diacids include adipic, pimelic, suberic, azelaic, sebacic, dodecanedioic, brassylic, tetradecanedioic, octadecanedioic acid, and mixtures thereof, and the like.

Another diacid which may be, and preferably is, used is dimerized fatty acid of 16 to 48 carbon atoms; that is, dimers derived from fatty acids of 8 to 24 carbon atoms. Such dimerized fatty acids are commercially available and have been fully described in the literature, including U.S. Pat. Nos. 3,076,003; 3,157,681 and 3,256,-304. These dimerized fatty acids are obtained by the catalytic or non-catalytic polymerization of ethylenically unsaturated fatty acids. Suitable catalysts for the polymerization include acid or alkaline clays, di-t-butyl peroxide, boron trifluoride and other Lewis acids, anthraquinone, sulfur dioxide, and the like. Non-catalytic polymerization generally requires higher temperatures. Suitable fatty acids for use in the polymerization include branched and straight chain, poly- and mono-ethylenically unsaturated acids such as 3-octenoic acid, 11-dodecenoic acid, linderic acid, lauroleic acid, myristoleic, tsuzuric, palmitoleic acid, petroselinic acid, oleic acid, elaidic acid, vaccenic acid, gadoleic acid, cetoleic acid, nervonic acid, linoleic acid, linolenic acid, eleostearic acid, eicosatetraenoic acid, nisinic acid, scoliodonic acid, and chaulmoogric acid. Quite often mixtures of these acids are used. Because of their ready availability and relative ease of polymerization, oleic and linoleic acids are the preferred starting materials for preparing dimerized fatty acids. The preferred dimerized fatty acids contain 36 carbon atoms.

Dimerized fatty acids generally contain at least about 60 percent of dimer in admixture with small amounts of monomer and trimer. These mixtures are frequently distilled to increase the dimer content by removal of monomer and trimer as described in U.S. Pat. No. 3,297,730. Preferably the dimerized fatty acid has a dimer content of at least about 90 percent. Dimerized fatty acids are also frequently hydrogenated as taught in U.S. Pat. No. 3,256,304 to reduce their color.

It is not necessary that the above recited polyamide-forming monomers be used per se in the polymerization reaction. It is necessary only that the resulting polyamide repeat units correspond to those derived from the recited monomers. The actual materials used in the polymerization reaction may be the recited monomers or polyamide-forming derivatives of these monomers, such as the acid chloride, ammonium salt, ester, half-ester, and the like. Lactams may be used in place of aminoacids, such as caprolactam in place of 6-aminocaproic acid.

The preferred melt-condensed polyamide interpolymers are those in which (a) about 40–55 percent of the amide equivalents are omega-aminocaproic acid repeat units, (b) about 10–25 percent of the amide equivalents are hexamethylene diamine adipate repeat units, (c) about 10–25 percent of the amide equivalents are hexamethylene diamine diacid repeat units in which the diacid is polymethylene diacid of 9 to 12 carbon atoms, and (d) about 10–25 percent of the amide equivalents are hexamethylene diamine diacid repeat units in which the diacid is selected from the group consisting of (1) polymethylene diacids of 9 to 12 carbon atoms different from the diacid of (c) above, and (2) dimerized fatty acid of 36 carbon atoms.

The most preferred melt-condensed polyamide interpolymers are those in which (a) about 40–45 percent of the amide equivalents are omega-aminocaproic acid repeat units, (b) about 15 to 25 percent of the amide equivalents are hexamethylene diaamine adipate repeat units, (c) about 15 to 25 percent of the amide equivalents are hexamethylene diamine diacid repeat units in which the diacid is polymethylene diacid of 10 to 12 carbon atoms, and (d) about 15 to 25 percent of the amide equivalents are hexamethylene diamine diacid repeat units in which the diacid is dimerized fatty acid of 36 carbon atoms.

The method of forming polyamides by melt-condensation is well known to those skilled in the art. This polymerization reaction is described, for example, in U.S. Pat. Nos. 2,252,554 and 2,285,009, and British Pat. No. 1,055,676. The reaction is carried out by heating diacids and diamines, or their polyamide-forming derivatives, and, if desired, aminoacids or their polyamide-forming derivatives, at temperatures of about 150° to 300° C. while driving off water and continuing the reaction until the desired molecular weight is obtained.

The resulting polyamides will contain substantially equimolar amounts of carbonyl groups and imine groups. The polymer end groups will be carboxylic acid and amine, one of which may be in excess depending upon which reactant was present in excess. Preferably, the polymers of this invention will have balanced ends, that is, will contain no more than about $50 \times 10^{-6}$ equivalents per gram of excess amine-ends or excess carboxyl-ends.

However, for some applications requiring good adhesion to certain substrates, it is desirable to modify the polyamide interpolymer to contain about $10–100 \times 10^{-6}$ equivalents per gram of excess amine-ends over carboxyl-ends with at least some of the excess amine being present as imine links in the polymer chain. This is conveniently accomplished by replacing a small amount, for example, about 1 percent, of the polymethylene diamine with an equimolar amount of polyethylene polyamine, such as, for example, diethylene triamine. In this case, prolonged high temperature finishing of the melt condensation should be avoided to minimize formation of imidazoline rings, according to known chemistry.

Since increasing the molecular weight of a polyamide increases its strength and toughness, it is desirable to adjust the molecular weight of the polyamides of this invention to the highest value consistent with the application requirements. Molecular weight is quantitatively related to melt viscosity and is expressed in terms of melt index which is an empirical measurement of inverse melt viscosity. Normally it is advantageous to adjust the products of this invention to a melt index of about 0.1 to 200 at 190° C. Preferably the polyamides of this invention have a melt index of about 1 to 20. It is well known, of course, to regulate the molecular weight of melt-condensed polyamides by inclusion of small amounts of monofunctional amines or acids.

The polyamides of this invention are soluble at room temperature at a concentration of at least about 20 percent by weight in a solvent mixture containing 2 parts of methanol and 1 part of toluene. Preferably, the polyamides of this invention are more soluble than 20 percent and are more soluble still at higher temperature. Also, they are more soluble still in a mixture of chloroform and methanol which is an especially effective mixture for dissolving polymethylene polyamides. However, since aromatic hydrocarbons are preferred as industrial solvents for many purposes as compared to chlorohydrocarbons based on toxicity and pollution considerations, they have been chosen as the criterion for measuring the unusual solubility of the polyamides of this invention.

Although a mixture of two parts by weight of methanol to one part by weight of toluene is used to specify the solubility characteristics of the polyamides of this invention, this is not necessarily the optimum ratio of toluene and methanol for any given polyamide. Other solvents may also be used in practical applications. The choice of solvent is not limited to those which are effective at the defined conditions of 20 percent polyamide concentration at 23° C. Suitable solvents include monohydric alcohols such as methanol, ethanol, propanol, isopropanol, the several butyl alcohols, amyl alcohols, methoxyethanol, ethoxyethanol, benzyl alcohol, furfuryl alcohol, and the like; aromatic hydrocarbons such as benzene, toluene, xylene, and the like; chlorohydrocarbons such as methylene chloride, chloroform, ethylene dichloride, methyl chloroform, trichloroethylene, and the like; and mixtures thereof.

One may test solubility by dissolving the polyamide in a suitable solvent at chosen concentrations with stirring at or near reflux and observing stability of the resulting solution at room temperature, a soluble composition being indefinitely stable. In borderline cases, this requires long waiting to determine whether or not the solution will gel. A preferred procedure is to stir the chosen concentrations at room temperature, in which case homogeneous solutions will be attained with soluble compositions within several hours. In general, a homogeneous solution obtained by stirring at room temperature will be indefinitely stable at the same temperature.

The polyamides of this invention in addition to their outstanding solvent solubility characteristics also retain valued nylon properties, that is, they possess a substantial degree of crystallinity. Generally, these polyamides have a crystalline heat of fusion of about 3 to 15 calories per gram. They also generally have a minimum flow temperature, that is, the temperature of incipient flow (temperature of complete crystalline melting), of between about 110° C. and 150° C.

The polyamide interpolymers of this invention are particularly useful in applications such as adhesives, coatings, and binders such as in thread bonding wherein they can be applied from a solution. The high solubility of these polymers allows them to be readily formulated in solution with polyepoxides, curing agents, accelerators, pigments, antioxidants, etc., according to known art.

EXAMPLES OF THE INVENTION

Thhe following examples, illustrating the novel polyamides disclosed herein, are given without any intention that the invention be limited thereto. All parts and percentages are by weight unless otherwise specified.

In these examples, melt index is measured according to ASTM test method D1238. All melt index numbers were obtained with the standard orifice at 190° C. using the 2160 gram weight, equivalent to 43.25 p.s.i. differential pressure. Minimum flow temperature is measured by observing the temperature of incipient flow of a sample in the melt index apparatus as the temperature is gradually increased from below the melting point using a standard orifice and load (2160 g.).

Heat of fusion is measured by molding a sample of polymer into a small disc, drying, encapsulating in a small crimped dish, melting, and annealing the sample by programmed cooling at 1° C. per minute or less. The sample is evaluated by known methods by differential thermal analysis in a Du Pont "Differential Scanning Colorimeter" (DSC) and compared with known heat of fusion standards.

Example 1

The following ingredients were charged to a resin kettle to yield an interpolymer having the following calculated percent of total amide equivalents:

|  | Parts | Percent of total amide equivalents |
|---|---|---|
| Caprolactam | 158.0 | 43.6 |
| Hexamethylene diamine | 105.0 |  |
| Adipic acid | 42.3 | 18.1 |
| Sebacic acid | 59.3 | 18.3 |
| Dimerized fatty acid | 185.0 | 20.0 |

The dimerized fatty acid (Empol 1010, Emery Industries, Inc.) was a commercial hydrogenated and fractionated product consisting principally of 36 carbon atom diacid with trace monomer and 2 percent trimer impurities.

Water was removed by known procedures by heating with stirring and purging with nitrogen at atmospheric pressure until the temperature reached 260° C., holding for 1.5 hours at this temperature, and discharging to metal blocks with adherent surfaces.

The polymer was characterized by methods described above with the following results:

Melt index, decigrams/min. _____ 3.3
Minimum flow temperature, ° C. _____ 127
Heat of fusion, cal./g. _____ 6.5

The polymer dissolved on stirring at 20 percent concentration at room temperature (23° C.) in a mixture of 2 parts of methanol and one part of toluene. The polymer also dissolved under the same conditions in a mixture of one part of toluene and two parts of methanol. The polymer was soluble at room temperature at a concentration of at least 33 percent in a mixture of equal parts of ethanol and chloroform.

Physical measurements on a molded film, which was well crystallized by slow cooling from the melt and conditioned for two days at 50 percent relative humidity and 23° C., gave the following results:

Initial tensile modulus, p.s.i. _____ 13,000
Approximate yield point, p.s.i. _____ 1,200
Elongation at yield, percent _____ 22
Tensile strength, p.s.i. _____ 6,700
Elongation at break, percent _____ 530
Durometer hardness, Shore A _____ 96

Taber abrasion (ASTM D1044 with CS17 wheel and 1000 g. at 1000 cycles) on molded and solution-cast films was 1–4 milligrams.

The same composition prepared on a larger scale gave the following physical test results when comparably tested:

|  | Test temperature, ° C. | | |
|---|---|---|---|
|  | −40 | +23 | +77 |
| Initial tensile modulus, p.s.i | 208,000 | 21,000 | 4,000 |
| Approximate yield point, p.s.i | 7,900 | 1,200 | 300 |
| Elongation at yield, percent | 1–11 | 14 | 11 |
| Tensile strength, p.s.i | 10,500 | 4,900 | 1,500 |
| Elongation at break, percent | 240 | 550 | 660 |

These physical test results demonstrate a high retention of nylon properties in combination with hitherto unknown solubility in common industrial solvents.

Example 2

A polymer was prepared in a manner similar to the procedure of Example 1 except that dodecanedioic acid was substituted for sebacic acid in the same molar proportions. The physical tests gave the following results:

Melt index, decigrams/min. _____ 1.9
Minimum flow temperature, ° C. _____ 139
Heat of fusion, cal./g. _____ 7.4

The polymer dissolved on stirring at 20 percent concentration at room temperature in a mixture of 2 parts of methanol and 1 part of toluene.

Example 3

A polymer having the following calculated percent of total amide equivalents was prepared in a manner similar to the procedure of Example 1 from the following polyamide-forming monomers.

| | Parts | Percent of total amide equivalents |
|---|---|---|
| Caprolactam | 288.5 | 51 |
| Hexamethylene diamine | 139.5 | |
| Adipic acid | 51.1 | 14 |
| Sebacic acid | 93.7 | 16.5 |
| Dodecanedioic acid | 95.1 | 18.5 |
| Diethylene triamine | 2.6 | |
| Acetic acid | 1.5 | |

The diethylene triamine and acetic acid were added in minor proportions for incidental control of molecular weight and property behavior in adhesive applications.

The physical test results were as follows:

Melt index, decigrams/min. _____ 8.4
Minimum flow temperature, ° C. _____ 130
Heat of fusion, cal./g. _____ 8.6

The polymer dissolved on stirring at 20 percent concentration at room temperature in a mixture of 2 parts of methanol and 1 part of toluene.

Example 4

A polymer having the following calculated percent of total amide equivalents was prepared in a manner similar to the procedure of Example 1 from the following polyamide-forming monomers.

| | Parts | Percent of total amide equivalents |
|---|---|---|
| Caprolactam | 249.5 | 44 |
| Hexamethylene diamine | 156.3 | |
| Adipic acid | 47.5 | 13 |
| Azelaic acid | 61.1 | 13 |
| Sebacic acid | 75.9 | 15 |
| Dodecanedioic acid | 86.3 | 15 |
| Acetic acid | 0.8 | |

The physical tests gave the following results:

Melt index, decigrams/min. _____ 37
Minimum flow temperature, ° C. _____ 118
Heat of fusion, cal./g. _____ 6.7

The polymer was soluble at 20 percent concentration at room temperature in a mixture of 2 parts of methanol and 1 part of toluene.

Although the invention has been described and exemplified by way of specific embodiments, it is not intended that it be limited thereto. As will be apparent to those skilled in the art, numerous modifications and variations of these embodiments can be made without departing from the spirit of the invention or the scope of the following claims. For example, substitution of one polymethylene chain for another has a relatively small predictable effect. But in any case, substitutions can be empirically evaluated and shifts in relative proportions can be made to compensate, at least in part, for certain observed effects.

I claim:

1. A melt-condensed polyamide interpolymer consisting essentially of at least four different recurring polyamide repeat units in which (a) 35 to 55 percent of the amide equivalents are polymethylene-ω-aminoacid repeat units of 6 to 20 carbon atoms,
   (b) 10 to 30 percent of the amide equivalents are diamine diacid repeat units in which the diamine is polymethylene diamine of 6 to 20 carbon atoms and the diacid is polymethylene diacid of 6 to 20 carbon atoms,
   (c) 10 to 30 percent of the amide equivalents are diamine diacid repeat units in which the diamine is polymethylene diamine of 6 to 20 carbon atoms and the diacid is polymethylene diacid of 6 to 20 carbon atoms different from the diacid of (b) above, and
   (d) 10 to 30 percent of the amide equivalents are diamine diacid repeat units in which the diamine is polymethylene diamine of 6 to 20 carbon atoms and the diacid is dimerized fatty acid of 16 to 48 carbon atoms containing at least 60 percent dimer, said polyamide being soluble to the extent of at least 20 percent, based on the weight of solution, at 23° C. in a solvent mixture containing 2 parts by weight of methanol and 1 part by weight of toluene.

2. The melt-condensed polyamide interpolymer of claim 1 which has a melt index of 0.1 to 200 at 190° C.

3. The melt-condensed polyamide interpolymer of claim 2 in which (a) 40 to 55 percent of the amide equivalents are omega-aminocaproic acid repeat units,
   (b) 10 to 25 percent of the amide equivalents are hexamethylene diamine adipate repeat units,
   (c) 10 to 25 percent of the amide equivalents are hexamethylene diamine diacid repeat units in which the diacid is polymethylene diacid of 9 to 12 carbon atoms, and
   (d) 10 to 25 percent of the amide equivalents are hexamethylene diamine diacid repeat units in which the diacid is dimerized fatty acid of 36 carbon atoms.

4. The melt-condensed polyamide interpolymer of claim 3 which has a melt index of 1 to 20.

5. A melt-condensed polyamide interpolymer of claim 4 in which (a) 40 to 45 percent of the amide equivalents are omegaaminocaproic acid repeate units,
   (b) 15 to 25 percent of the amide equivalents are hexamethylene diamine adipate repeat units,
   (c) 15 to 25 percent of the amide equivalents are hexamethylene diamine diacid repeat units in which the diacid is polymethylene diacid of 10 to 12 carbon atoms,
   (d) 15 to 25 percent of the amine equivalents are hexamethylene diamine diacid repeat units in which the diacid is dimerized fatty acid of 36 carbon atoms.

6. The melt-condensed polyamide interpolymer of claim 1 in which the dimerized fatty acid contains at least 90 percent dimer.

References Cited
UNITED STATES PATENTS

| 3,637,551 | 1/1972 | Sprauer | 260—18 |
| 2,252,554 | 8/1941 | Carothers | 260—78 |
| 2,285,009 | 6/1942 | Brubaker et al. | 260—78 |
| 2,252,555 | 8/1941 | Carothers | 260—78 |
| 3,499,853 | 3/1970 | Griebsch et al. | 260—18 |

DONALD E. CZAJA, Primary Examiner

E. C. RZUCIDLO, Assistant Examiner

U.S. Cl. X.R.

260—78 A, 78 L, 857 R